June 21, 1960 M. J. TAUBENSLAG ET AL 2,942,147

CATHODE RAY TUBE CURSOR APPARATUS

Filed April 7, 1958 2 Sheets-Sheet 1

WITNESSES:
Bernard R. Gieguey
Leon M. Garman

INVENTORS
Morris J. Taubenslag, David E. Goulden and Joseph Hamburger.
BY Maury I. Hull
ATTORNEY United States Patent Office 2,942,147

Patented June 21, 1960

2,942,147

CATHODE RAY TUBE CURSOR APPARATUS

Morris J. Taubenslag, Baltimore, and David E. Goulden and Joseph Hamburger, Glen Burnie, Md., assignors to Westinghouse Electric Corporation, East Pittsburgh, Pa., a corporation of Pennsylvania Filed Apr. 7, 1958, Ser. No. 726,806

11 Claims. (Cl. 315—22)

This invention relates to improvements in cursor circuits for cathode ray tubes, and more particularly to an improved cursor circuit particularly suitable for use with direct viewing storage tubes, having means for automatically controlling the brightness of the cursor as it is moved, and means for preventing the movement of the cursor from obscuring other signals or information.

Prior art cursor circuits for use with cathode ray tubes of the storage type have not successfully solved problems which arise from the basic nature of a storage tube. While the cursor is stationary, it is necessary to maintain the beam current at a low amplitude to prevent blooming, and while the cursor symbol is moving the beam current of the writing gun which produces the cursor is not great enough to charge the insulator surface sufficiently to provide satisfactory brightness for the cursor, and accordingly the location of the moving cursor symbol is unknown until the cursor symbol comes to rest on the face or viewing screen of the tube. Also, if the writing beam which produces the cursor is made sufficiently intense so that the cursor is visible as it moves across the face of the tube, the cursor is harmful to the display of other information, for example, it may obscure vital radar information.

The apparatus of the instant invention provides a circuit for automatically adjusting the writing beam intensity in accordance with the rate of movement of the beam which produces the cursor symbol, with the result that blooming does not occur when the cursor symbol is stationary; and a circuit arrangement is provided for insuring that other information on the face of the cathode ray storage tube is not obscured as the cursor is moved across the face of the tube, while at the same time permitting the position of the cursor to be known.

These results are provided for by employing differentiator apparatus operatively connected to the potentiometer arms which vary the cursor writing beam deflection voltages; changes in the values of the deflection voltages when the cursor position potentiometers are moved cause the differentiators to develop a pulse signal output whose amplitude is proportional to the rate of change of the deflection voltages at the arms of the position potentiometers. This pulse is shaped in an amplifier circuit and applied to the intensity control grid of the cursor writing beam of the storage tube. An increase in the rate of change of the voltage at the position potentiometers accordingly increases the cursor writing beam current in the storage tube such that decreased dwell time of the writing beam on the storage dielectric is compensated for by increased beam current, the amount of storage is maintained more nearly constant, and the brightness of the cursor trace is maintained more nearly constant, with the result that the trace formed by the cursor writing beam can be seen as the beam is moved.

In order not to obscure areas of stored information, the cursor is operated on during its travel across the face of the storage tube. The cursor is collapsed into a dot when it is moved by stopping the generation of the cursor symbol signal, this dot being the center of the cursor; the user of the apparatus places the dot over the selected target or other radar signal and when the position potentiometers are released, the dot reverts back to the normal cursor symbol, for example, a circle.

The principles underlying the operation of the automatic writing beam intensity control portion of the apparatus of the instant invention are fully disclosed in a copending patent application Serial No. 715,039, filed February 13, 1958, by M. J. Taubenslag and D. E. Goulden entitled Moving Symbol Presentation Storage Tube Apparatus, and assigned to the assignee of the instant application.

Accordingly, a primary object of the instant invention is to provide new and improved cursor apparatus for cathode ray storage tubes.

Another object is to provide a new and improved cursor circuit for use with direct viewing storage tubes in which movement of the cursor on the viewing screen of the tube does not obscure other information displayed simultaneously on the screen.

Another object is to provide a new and improved cursor circuit having means for automatically adjusting the beam intensity of the writing gun producing the cursor in accordance with the speed or rate of movement of the cursor to thereby maintain the brightness of the cursor symbol at a desired value.

Still a further object is to provide a new and improved cursor circuit for storage tube apparatus in which the cursor symbol is automatically collapsed to a dot as the cursor is moved and automatically restored to its normal cursor symbol shape when the movement of the cursor symbol is stopped.

These and other objectives will become more clearly apparent after a study of the following specification when read in connection with the accompanying drawings, in which.

Figure 2:
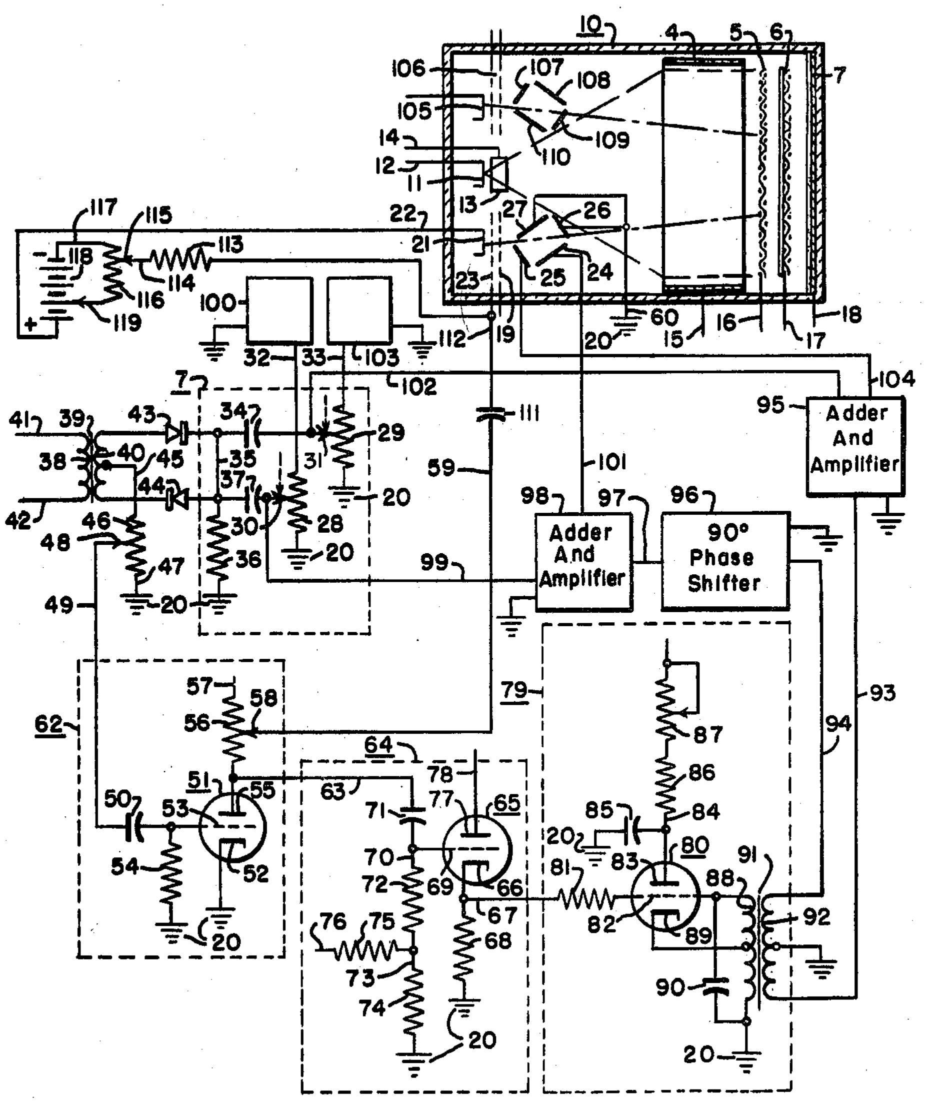
Fig. 2 is a schematic electrical circuit diagram of the apparatus of Fig. 1 showing the circuit in more detail.

Particular reference should be made now to Fig. 2 for a more detailed understanding of the invention. The reference numeral 10 generally designates a storage tube of the visual display type in which an electrical input is provided and a visual output is obtained. The tube 10 may have a flood gun or reading gun having an electron source or cathode 11 which is connected by lead 12 to a suitable circuit point, which may be a source of potential or may be a common circuit point such as ground depending upon the choice of a storage tube used at 10 and the potentials on the other elements. The flood or reading gun has a beam dispersing element 13 which may be connected by lead 14 in any suitable manner to any desired circuit point, for example, to the positive terminal of a source of potential, not shown, which has the other terminal thereof connected to a common circuit point. The function of the element 13 is to disperse electrons originating at 11, for reasons which will be hereinafter more clearly apparent, into a scatter pattern wherein the flood gun electrons will approach all areas of the storage dielectric in substantially uniform numbers. The tube 10 may be similar to the cathode ray storage tube shown and described in the aforementioned copending patent application and may have in addition to the elements shown, a collimating electrode 4 which is connected by way of lead 15 to a suitable circuit point which may, for example, be the positive terminal of a source of potential, not shown, having the other terminal thereof connected to ground, the collimating electrode 4 bending the paths of electrons originating at source 11 of the flood gun so that the electrons approach the storage element at substantially perpendicular paths with respect thereto. The storage element of tube 10 is designated 6 and may comprise a foraminated or mesh like structure of conductive material of suitable shape to fit in the cathode ray tube, having a suitable dielectric or insulator material such, for example, as silicon monoxide sprayed on the side thereof facing the flood and writing guns, the mesh or backing being connected by lead 17 to a suitable circuit point which may, if desired, be the positive terminal of a small source of potential, not shown, having the other terminal thereof connected to a common circuit point. Between the storage element 6 and the aforementioned flood or reading gun is located a collector element 5 which may comprise a foraminated or mesh like structure preferably having somewhat larger openings than the openings in the storage element 6 and being connected by lead 16 to a suitable circuit point, for example, the positive terminal of a source of potential, not shown, having the other terminal thereof connected to ground. The luminous symbols of the storage tube may be provided by a suitable coating adapted to provide a visual image when electrons impinge thereon, for example, a phosphorous compound sprayed on a transparent conducting material which lies adjacent the inner surface of the viewing end of the tube, the transparent conducting material and phosphorus compound being designated 7, the transparent conducting material being connected by lead 18 to the positive terminal of a suitable source of potential, not shown, having the other terminal thereof connected to ground 20.

In addition to the flood or reading gun aforedescribed, the storage tube 10 also has a cursor writing gun having a cathode or electron source 21, a beam intensity control grid 23 and beam deflection plates 24 to 27 inclusive for deflecting the beam to any desired spot on the storage element 6 in accordance with variations in the deflection voltages applied to the deflection plates. In addition to the elements shown, the cursor writing gun portion of the storage tube 10 may have, if desired, means for focusing the beam of electrons originated at 21 into a narrow beam.

As was previously stated, the cursor apparatus of the instant invention is particularly suitable for use with cathode ray storage tube apparatus where, in addition to the cursor symbol, other information or another signal is continuously or intermittently displayed on the face or viewing screen of the tube, and to this end the storage tube 10 has an additional writing gun hereinafter to be more fully described which is adapted to write on the storage element 6 the signal information to be displayed, for example, a radar signal indicating the range, azimuth, or elevation of a target, etc.

The operation of a visual indication type storage tube such as the tube 10 is well known in the art and need not be described in detail, the writing gun providing an electron beam which passes through the collector mesh 5 and to the storage dielectric 6, varying the charge thereon and thereby varying the number of electrons from the flood or reading gun which strike the phosphorescent surface 7 providing the indication, the number of electrons passing through the storage element at any spot or small area varying with variations in the charge on the storage element at the particular spot or area. An erase pulse, applied to the backing mesh of the storage dielectric by lead 17 from any convenient source, not shown, is on continuously and continuously tends to erase the stored information on the storage element, for reasons which will become hereinafter more clearly apparent.

A pair of potentiometers 28 and 29 are provided as shown having the arms 30 and 31, respectively, which are positioned by the user of the apparatus either manually or by mechanical means to vary cursor writing beam deflection voltages derived from the potentiometers and move the cursor to the desired position on the face or viewing screen of the cathode ray tube 10. The potentiometer 28 has one terminal thereof connected to ground 20 and the other terminal thereof conected by lead 32 to a suitable source of direct current potential 100. Potentiometer 29 has one terminal thereof connected to ground 20 and the other terminal thereof connected by lead 33 to a suitable source of direct current potential 103. The arm 31 of potentiometer 29 is connected by way of capacitor 34, lead 35 and resistor 36 to ground 20. The aforementioned arm 30 of potentiometer 28 is connected by way of capacitor 37 to lead 35. The capacitors 34 and 37 together with resistor 36 comprise a differentiating circuit or circuits with outputs which are proportional to the rates of change of the voltages at arms 31 and 30 respectively.

A pulse generating circuit is provided which may include a transformer of any convenient design having a primary 38, core 39 and center tapped secondary 40, the primary 38 being connected by leads 41 and 42 to a suitable source of energizing potential which may be 400 cycles per second alternating current and a voltage of, for example, 6.3 volts. One terminal of the secondary 40 is connected by way of rectifier 43 to the aforementioned lead 35 whereas the other terminal of the secondary 40 is connected by way of rectifier 44 to lead 35, rectifiers 43 and 44 having opposite terminals connected to the respective terminals of secondary 40, as shown. Preferably secondary 40 has sufficient impedance to limit current flow to a desired value. The center tap of secondary 40 is connected by way of lead 45, potentiometer 46 and lead 47 to ground 20. The voltage obtained from the arm 48 of potentiometer 46 is a pulse having a repetition rate controlled by the frequency of the voltage applied to leads 41 and 42 and an amplitude which is controlled by the setting of the potentiometer arm 48 and also by the value of the outputs of the differentiators including capacitors 34 and 37, and accordingly, while the position of the arm 48 is maintained constant, the amplitude of the pulses on lead 49 is substantially proportional to the sum of the rates of change of the voltages at potentiometer arms 30 and 31 and is accordingly proportional to the rate of movement of the cursor symbol across the viewing screen of the storage tube 10.

The pulse on lead 49 is amplified by an amplifier circuit 62 which may be of conventional design including the coupling capacitor 50, a triode tube 51 having a cathode 52 connected to ground 20, a control grid 53 connected to the capacitor 50 and by way of resistor 54 to ground 20, an anode 55 connected by way of lead 63, potentiometer 56 and lead 57 to the positive terminal of a suitable source of anode potential, not shown, having the negative terminal thereof connected to ground 20. The arm 58 of potentiometer 56 is connected by way of lead 59, capacitor 111 and lead 112 to the aforementioned intensity control grid 23 of the cursor writing gun of storage tube 10. Lead 112 is connected by way of resistor 113 and lead 114 to the arm 115 of a potentiometer 116 having one end thereof connected by lead 117 to the negative terminal of a battery or other source of potential 118, the other end of potentiometer 116 being connected by lead 119 to a tap on battery 118, the positive terminal of battery 118 being connected to the aforementioned lead 22 and thence to cathode 21, thereby providing that grid 23 is biased to control the background level, the bias being adjustable by moving arm 115. In accordance with the position of the potentiometer arm 58, the beam intensity of the cursor writing gun is controlled by the amplitude of the pulses on lead 49, causing an increase in the beam intensity while the writing beam producing the cursor symbol is moving and causing a decrease in writing beam intensity to a normal value when the cursor assumes a stationary position, the normal value being adjusted at least in part by adjusting the position of arm 58 so that a desired amount of storage takes place in the dielectric 6 to result in the passage of the desired number of electrons to the phosphorescent surface to provide a cursor symbol indication of the desired brightness. Grid 19 of the cursor writing gun may also be used in a conventional manner to assist in controlling writing beam intensity, grid 19 being a second anode with a fixed potential applied thereto from any convenient source, not shown.

The output of the aforementioned amplifier comprising tube 51 is applied by way of aforementioned lead 63 to a biased buffer stage generally designated 64 and including an electron discharge tube 65 and associated components connected as a cathode follower. The tube 65 is seen to have a cathode 66 connected by way of lead 67 and resistor 68 to ground 20, and a grid 69 connected by way of lead 70 and capacitor 71 to the aforementioned lead 63 and thence to the amplifier stage 62. The lead 70 is connected by way of resistor 72, lead 73 and resistor 74 to ground 20, and the lead 73 which is the junction between the aforementioned resistors 72 and 74 is connected by way of resistor 75 and lead 76 to the negative terminal of a suitable source of direct current biasing potential, not shown, which has the other terminal thereof connected to ground 20. The anode 77 of tube 65 is connected by way of lead 78 to the positive terminal of an additional suitable source of potential, not shown, having the other terminal thereof connected to ground 20. Tube 65 is normally cut off by the bias on grid 69, and is rendered conductive by the positive pulse output of amplifier 62.

The output of the biased buffer stage 64, which is zero while both potentiometer arms 30 and 31 are stationary, is applied by the aforementioned lead 67 to a cursor symbol signal generator generally designated 79, the cursor symbol signal generator 79 being seen in Fig. 2 to include an electron discharge tube 80 and associated circuit components, which comprise an oscillator for generating an alternating current voltage of suitable frequency such for example as 40 kilocycles and substantially sinusoidal wave form. The oscillator circuit of generator 79 includes a resistor 81 operatively connecting the lead 67 to the control grid 82 of the tube 80, the tube 80 having an anode 83 connected by way of lead 84 and capacitor 85 to ground 20, lead 84 also being connected by way of a series resistor 86 and a variable resistor 87 to the positive terminal of a suitable source of anode potential, not shown, which has the other terminal thereof connected to ground 20. The aforementioned control grid 82 is connected to one terminal of the tapped primary winding 88 of a transformer having the tap thereof connected to the cathode 89 of tube 80 and having the other terminal of the primary 88 connected to ground 20, primary 88 having capacitor 90 connected thereacross. The transformer having the aforementioned primary 88 has a core 91 and a center tapped secondary 92, the center tap of secondary 92 being connected to ground 20 as shown, and the terminals of the secondary 92 being connected by way of leads 93 and 94 respectively to an adder and amplifier shown in block form and generally designated 95 and to a 90° phase shifter shown in block form and generally designated 96.

As is well known in the art, a circular trace or pattern may be produced on the screen of a cathode ray tube by applying to two pairs of deflection plates sinusoidal voltages of the same frequency and amplitude but displaced in phase 90° from each other. The circular cursor symbol or trace is shown on the viewing screen of tube 10 in Fig. 1, and is designated 8. The output of the 90° phase shifter 96 is accordingly applied by way of lead 97 to a second deflection amplifier and voltage adding circuit shown in block form and designated 98. The adder and deflection amplifier 98 has an additional input thereto by way of lead 99 which is operatively connected to the aforementioned potentiometer arm 30.

As previously stated, the apparatus of the instant invention provides for displaying on the visual indication screen of a visual type storage tube a radar signal and simultaneously displaying on the screen a cursor which may be positioned manually or automatically by the user of the apparatus to a position corresponding to a selected radar signal or identifying a selected radar signal or target by circling the signal. The aforementioned potentiometer arm 30 picks off a direct current voltage from the potentiometer 28 in accordance with the position of the arm, the potentiometer 28 having a direct current potential from aforementioned source 100 applied thereto by way of the aforementioned lead 32. The adder and amplifier circuit 98 may be of conventional design for providing an amplifier output on lead 101 which is a direct current voltage having superimposed thereon the alternating current voltage output of the 90° phase shifter 96, with the result that the voltage on lead 101 is a direct current voltage of varying amplitude. Lead 101 is connected to deflection plate 24 of the pair of vertical deflection plates, the other vertical deflection plate 27 being connected by way of lead 60 to ground 20.

The aforementioned horizontal deflection amplifier and voltage adding circuit 95 have in addition to the alternating current input on the aforementioned lead 93 a direct current input by way of lead 102 from the arm 31 of potentiometer 29 which is energized with a direct current potential by way of aforementioned lead 33 from aforementioned source 103. The direct current voltage on lead 102 is used for positioning the beam of the cursor writing gun in a horizontal plane, and the output of the adder and amplifier 95 on lead 104 is a varying direct current voltage having a steady direct current component and an alternating current component, and which is applied to one horizontal deflection plate 25 of the cursor writing gun, the other horizontal deflection plate 26 being connected by way of the aforementioned lead 60 to ground 20.

Figure 3:
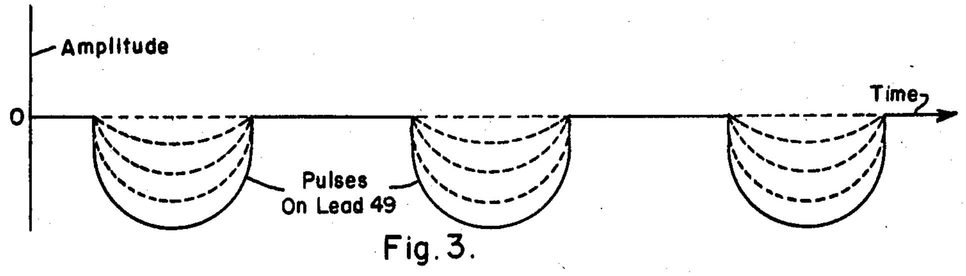
Fig. 3 is a graph illustrating the operation of the apparatus of Figs. 1 and 2.

In the operation of the apparatus of Fig. 2, as aforementioned the capacitors 34 and 37 together with resistor 36 differentiate the changing direct current potentials developed at potentiometer arms 31 and 30, respectively. Potentiometer 46 is as aforementioned connected to the center tap of the secondary 40 of the alternating current transformer and when rectifiers 43 and 44 conduct a voltage is developed across potentiometer 46. The alternating current signal impressed on the primary 38 accordingly appears across resistor 46 as a modulated pulse signal whose amplitude is controlled by the signal impressed across lead 35 which interconnects rectifiers 43 and 44. The amplitude of this modulation as shown in Fig. 3 is a function of the rates of movement of the potentiometer arms 30 and 31, the dashed lines indicating possible pulse amplitudes less than maximum. The ouput of the modulator or pulse generator is applied by way of lead 49 to the amplifier stage 62. The wave form of the ouput on lead 49 is operated on in the circuit of tube 51 in such a manner that the leading and trailing or falling edges are steepened and the top of the wave form is flattened, providing in effect a pulse of substantially rectangular shape. The controlled amplitude of this pulse is then impressed by way of lead 59, capacitor 111 and lead 112 on the intensity control grid 23 in the storage tube 10 controlling the beam current in the writing gun which produces the cursor symbol. Accordingly the intensity of the beam of the cursor writing gun is varied proportionally to the rate of movement of the cursor symbol across the viewing screen of the storage tube. Increases in the intensity of the writing beam provide that the path of the writing beam on the storage element 6 results in a greater charge on the dielectric per unit of time that the beam dwells on a particular spot of the dielectric, with the result that the passage of flood gun electrons to the phosphorescent surface which provide the visual image is maintained at a desired value to provide for the desired brightness of the cursor symbol as it moves.

The output of the amplifier 62 is fed by way of the aforementioned lead 63 to an aforementioned cathode follower circuit including triode tube 65 which is normally cutoff by the bias developed across resistors 72 and 74. Cathode follower 65 is rendered conducting by the positive pulse output of amplifier 62, and when the cathode follower 65 conducts a low impedance is impressed across the parallel resonant circuit made up of the primary 88 of the transformer and the capacitor 90. The loading of this resonant circuit with a parallel impedance of very low value stops the generation of oscillations in the tube 80. When this voltage of 40 kilocycles is stopped, the cursor symbol collapses to a dot as seen on the visual screen. Movement of the dot produces a line 9, Fig. 1, on the viewing screen. It will be noted that this collapse of the cursor symbol from a circle to a dot occurs when either of the position potentiometers 28 and 29 have their arms 30 and 31, respectively, moved by a predetermined minimum amount. When both potentiometer arms stop, the generation of oscillations in tube 80 resumes, and the cursor symbol becomes a circle again as indicated by circle 8', Fig. 1.

As previously stated, the storage tube 10 is adapted to display simultaneously with the cursor a radar signal, and to this end an aforementioned additional writing gun is provided in the tube 10 having elements including the cathode 105, Fig. 2, beam focusing element 106 and deflection plates 107, 108, 109 and 110.

Whereas there has been shown and described a visual indication storage tube having two writing guns and one flood or reading gun which may be continuously energized while the writing takes place, and having a collimating element, a foraminated collector element, a storage dielectric element, and a visual image producing luminescent or phosphorescent material mounted on a transparent conducting surface on the face of the tube and maintained at a high positive potential to attract flood gun electrons thereto, other types of storage tubes could be employed, suitable rearrangement of the circuit being made in manners which would be apparent to one skilled in the art.

As previously stated, erasing may be accomplished by applying an erase pulse of predetermined amplitude, repetition rate, width, and polarity of by way of lead 17 to the backing for the storage dielectric material, the erase pulse being controllable with respect to one or all of its characteristics to thereby provide for erasing at a desired and adjustable rate.

Any suitable circuit, not shown, may be connected to the radar signal writing gun for producing a signal on the viewing screen of the tube and have means associated therewith, not shown, for positioning the radar signal utilizing the aforementioned deflection plates 107, 108, 109 and 110.

Figure 1:
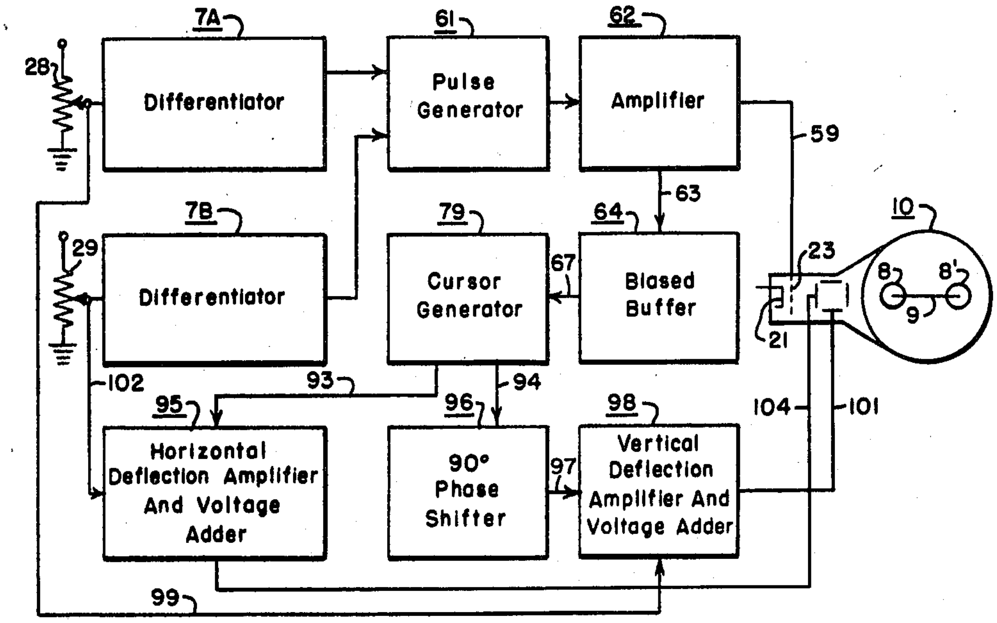
Figure 1 is a circuit diagram, in block form, of the preferred embodiment of the invention.

For clarity of illustration only, the storage tube 10 of Fig. 1 has shown therein only the writing gun for producing the cursor symbol and the deflecting plates for the cursor writing beam.

Whereas the invention has been shown and described with reference to a cursor symbol normally of circular shape, it should be understood that cursor traces of other shapes could be employed, suitable cursor signal generator apparatus adapted to be stopped upon movement of the cursor being provided.

That portion of the above described circuit pertaining to the collapse of the cursor symbol to a dot when the cursor is moved and the restoration of the cursor to its normal shape when it comes to rest may be employed by itself if desired, and with conventional cathode ray tubes of the non-storage type.

Tube 10 may, if desired, be replaced by a storage tube of the electrical input-electrical output type.

Whereas the invention has been shown and described with respect to a preferred embodiment thereof which gives satisfactory results, it should be understood that changes may be made and equivalents substituted without departing from the spirit and scope of the invention.

We claim as our invention:

1. In apparatus for producing a movable cursor on the viewing screen of a cathode ray tube, in combination, cathode ray storage tube means including writing beam producing means and deflecting means for the writing beam, cursor symbol signal obtaining means operatively connected to said cathode ray storage tube means for supplying a cursor signal thereto, beam deflection variable signal obtaining means operatively connected to said storage tube means, and means including differentiator means operatively connected to said beam deflection signal obtaining means and to said storage tube means for varying the intensity of the beam in accordance with the rate of variation of the deflection signal.

2. In cathode ray tube apparatus for producing a cursor symbol, in combination, cathode ray tube means including a viewing screen, cursor symbol signal obtaining means operatively connected to the cathode ray tube means and normally producing on said screen a cursor symbol having a predetermined shape, signal means operatively connected to said cathode ray tube means for moving the cursor symbol on said screen, and means operatively connecting the signal means to the symbol signal obtaining means for causing the cursor symbol to change from its normal shape to a dot on the screen when the cursor is moved on said screen and to reassume its normal shape when the movement thereof is stopped.

3. In apparatus for producing a movable cursor on the screen of a cathode ray tube, in combination, cathode ray storage tube means having beam producing means and deflecting means for the beam, means for obtaining at least one variable deflection signal, signal adder means operatively connecting said means for obtaining a deflection signal to said deflecting means, cursor symbol signal obtaining means operatively connected to said signal adder means for supplying a cursor signal thereto, and means operatively connected to said means for obtaining a deflection signal and to said beam producing means for varying the intensity of the beam in accordance with the rate of variation of the deflection signal.

4. In apparatus for producing a circular cursor symbol on the screen of a cathode ray tube, in combination, cathode ray tube means including beam producing and beam deflecting means, potentiometer means operatively connected to said cathode ray tube means and constructed and arranged to supply a pair of beam deflection voltages, cursor symbol signal producing means operatively connected to said cathode ray tube means, said cursor symbol signal producing means normally causing a circular cursor symbol to appear on the screen of the cathode ray tube means, and means operatively connecting the potentiometer means and the cursor symbol signal producing means and constructed and arranged to stop the production of the cursor symbol signal upon variation in either of the deflection voltages applied to the cathode ray tube means and thereby change the cursor symbol from a circular trace to a dot on the screen of the cathode ray tube means.

5. In cathode ray tube apparatus for providing a cursor symbol, in combination, cathode ray tube means including a viewing screen, symbol signal obtaining means operatively connected to said cathode ray tube means for providing on said screen a cursor symbol normally having a predetermined shape, other signal means operatively connected to the cathode ray tube means for moving the cursor symbol, means operatively connected to the other signal means and to the symbol signal obtaining means for causing the symbol to change from its normal shape to substantially a dot when the symbol is moved on said screen, and means operatively connecting the other signal means to the cathode ray tube means for providing a brightness control signal to the cathode ray tube means which varies in amplitude in accordance with variations in the rate of movement of the cursor symbol, said cathode ray tube means being constructed and arranged to utilize the brightness control signal to maintain the brightness of the cursor symbol at a preselected value as the cursor is moved on said screen.

6. In cathode ray tube apparatus for producing a movable circular cursor symbol, in combination, cathode ray tube means including a viewing screen, beam producing means and first and second beam deflection means for deflecting the beam in a pair of mutually perpendicular planes, potentiometer means for deriving a pair of beam deflection voltages of variable amplitudes to move the cursor on said screen, signal deriving means operatively connected to said potentiometer means for deriving a signal when either of said deflection voltages is varied, cursor symbol signal generating means operatively connected to said first and second beam deflection means and providing a normally circular cursor symbol on the screen of said tube in a position thereon under the control of the beam deflection voltages, biased means operatively connected to said cursor symbol signal generating means and adapted to stop the production of the cursor signal and collapse the cursor symbol to a dot when the biased means has a signal applied thereto, and means operatively connecting the biased means to the signal deriving means to apply the signal from the signal deriving means to the biased means to thereby stop the production of the circular cursor symbol when either of the deflection voltages is changed and collapse the cursor symbol to a dot.

7. In cathode ray tube apparatus for providing a movable cursor symbol having a preselected normal shape, in combination, cathode ray storage tube means, cursor symbol signal means operatively connected to said cathode ray storage tube means, said cathode ray storage tube means having a viewing screen and beam producing means and beam deflecting means for producing the cursor symbol and for moving the cursor symbol when varying signals are applied thereto, variable signal obtaining means operatively connected to said beam deflecting means for moving the cursor symbol, means operatively connecting said variable signal obtaining means to said beam producing means for varying the beam intensity in accordance with changes in the rate of movement of the beam, and means operatively connecting said variable signal obtaining means to said cursor symbol signal means for stopping the cursor signal and causing the cursor symbol to change from its normal shape to a dot when the symbol is moved on said screen.

8. In cathode ray tube apparatus for providing a movable cursor, in combination, direct viewing storage tube means including a flood gun continuously operating, a dielectric storage element, a cursor writing gun including beam intensity control means and first and second beam deflection control means adapted for moving the writing beam in a pair of substantially mutually perpendicular planes in accordance with variations in deflection voltages applied thereto, potentiometer means operatively connected to both the beam deflection control means for providing beam deflection voltages, cursor symbol signal producing means operatively connected to said first and second beam deflection control means, and means including differentiator means operatively connecting said potentiometer means and said beam intensity control means whereby the writing beam is automatically increased in intensity when said deflection voltages are varied and the writing beam is moved, the increase in intensity being substantially proportional to the rate of movement of the writing beam, said increase in beam intensity maintaining the storage provided by the writing beam substantially constant despite variations in the dwell time of the writing beam on the storage element to thereby maintain the brightness of the cursor indication at a preselected value.

9. In direct viewing storage tube apparatus for providing a movable cursor symbol, in combination, direct viewing storage tube means having a flood gun and at least one writing gun having means for controlling the intensity of the writing beam and means for deflecting the writing beam, means for obtaining a variable direct current beam deflection voltage, means operatively connected to said voltage obtaining means for obtaining a pulse having an amplitude proportional to the rate of change of the deflection voltage, circuit means for applying said pulse to said beam intensity control means to vary the intensity of the writing beam in accordance with variations in the amplitude of the pulse, means for generating a cursor symbol signal, means operatively connecting said generating means to said pulse obtaining means for stopping the generation of the cursor symbol signal when a pulse is obtained, and circuit means operatively connecting said generating means to the beam deflecting means, said generating means and circuit means providing for a cursor trace normally having a preselected shape on the viewing screen of the storage tube means while the cursor is stationary and providing for the collapse of the cursor symbol to a dot on said screen when the cursor symbol is moved.

10. In apparatus for producing a cursor on a cathode ray tube screen, in combination, cathode ray tube means having at least beam forming means and first and second beam deflection means adapted to deflect the beam in a pair of mutually perpendicular planes, first and second potentiometer means having adjustable arms for obtaining first and second deflection control voltages, first and second adder and amplifier means operatively connecting said first and second potentiometer means to said first and second deflection means respectively, means including an oscillator normally operating to produce a sine wave of predetermined frequency, means including phase shifter means operatively connecting said oscillator means to both said first and second adder and amplifier means for applying to the adder and amplifier means sinusoidal voltages of the same frequency and amplitude substantially 90° out of phase with each other, and means operatively connected to both said potentiometer means and to said oscillator means and constructed and arranged to upon the movement of the arm of either of the first and second potentiometer means stop the generation of oscillations in said oscillator means, the stopping of said oscillations causing the cursor symbol to change from a normal circular shape to a dot on the screen of the cathode ray tube means.

11. In cathode ray tube apparatus for providing a movable cursor symbol having a preselected normal shape, in combination, storage tube means having a reading gun substantially continuously operating, writing gun means including beam forming means, a beam intensity control element and beam deflection control means for moving the writing beam, a storage element in said storage tube means and an element adapted to give a visual image when electrons from said reading gun impinge thereon, means for obtaining a beam deflection signal, means operatively connecting said beam deflection signal obtaining means to said beam deflection control means, differentiator means operatively connected to said means for obtaining a beam deflection signal and constructed and arranged to provide an output pulse having an amplitude substantially proportional to the rate of change of the beam deflection signal, means operatively connecting said differentiator means to said beam intensity control element to increase the beam intensity as the beam is moved to thereby maintain the storage in said storage element substantially constant despite variations in the dwell time of the writing beam on a particular area of the storage element and accordingly maintain the brightness of the symbol on the viewing screen at a preselected value, other signal means operatively connected to the beam deflection control means for normally providing a cursor trace of said preselected shape, and means operatively connecting said other signal means to said differentiator means for changing said trace from its normal shape to a dot when said deflection signal changes.

References Cited in the file of this patent

UNITED STATES PATENTS

| | | |
|---|---|---|
| 2,078,644 | Swedlund | Apr. 27, 1937 |
| 2,603,755 | Chipp | July 15, 1952 |